United States Patent [19]

Takara

[11] Patent Number: 5,747,902
[45] Date of Patent: May 5, 1998

[54] ROTARY APPARATUS

[76] Inventor: Muneaki Takara, 19-20, Oroku 1-chome, Naha-shi, Okinawa 901-01, Japan

[21] Appl. No.: 232,171
[22] PCT Filed: Oct. 28, 1992
[86] PCT No.: PCT/JP92/01394
 § 371 Date: Jun. 9, 1994
 § 102(e) Date: Jun. 9, 1994
[87] PCT Pub. No.: WO93/09589
 PCT Pub. Date: May 13, 1993

[30] Foreign Application Priority Data

Jun. 17, 1992 [JP] Japan .................. 4-183215

[51] Int. Cl.⁶ .................. H02K 7/02; H02K 7/10; H02K 11/00
[52] U.S. Cl. .................. 310/75 D; 310/74; 310/103
[58] Field of Search .................. 310/75 D, 74, 310/103

[56] References Cited

U.S. PATENT DOCUMENTS

| | | | |
|---|---|---|---|
| 2,790,095 | 4/1957 | Peek et al. | 310/103 |
| 3,267,310 | 8/1966 | Ireland | 310/103 |
| 3,378,710 | 4/1968 | Martin, Jr. | 310/104 |
| 3,936,683 | 2/1976 | Walker | 310/103 |
| 4,058,024 | 11/1977 | Gordon | 74/572 |
| 4,112,785 | 9/1978 | Brobeck | 74/572 |
| 4,163,164 | 7/1979 | Pieters | 310/103 |
| 4,381,466 | 4/1983 | Laenens | 310/103 |
| 4,732,225 | 3/1988 | Jurgens et al. | 175/92 |

*Primary Examiner*—Steven L. Stephan
*Assistant Examiner*—Tran Ngoc Nguyen
*Attorney, Agent, or Firm*—Fish & Richardson P.C.

[57] ABSTRACT

A completely novel rotary apparatus is provided which can rotate a composite rotor at a high speed by utilizing the magnetic force, the composite rotor being comprised of a plurality of ring-shaped rotors arranged concentrically with each other. The rotary apparatus has the feature that a central rotor is centrally arranged so as to be rotatable; a plurality of ring-shaped rotors are arranged concentrically with said central rotor in a relationship spaced apart from each other so as to be rotatable coaxially with said central rotor about its rotational axis; a group of magnetic poles are disposed on a surface of each rotor on the side facing a surface of the adjacent rotor; a group of the magnetic poles disposed on the surface of each rotor is so arranged as to make each of the magnetic poles equal in polarity to another group of the magnetic poles disposed on the surface of the adjacent rotor; and each magnetic pole of the group of the magnetic poles of each rotor is arranged alternately in the rotational direction with each respective magnetic pole of the another group of the magnetic pole of the adjacent rotor.

8 Claims, 12 Drawing Sheets

FIG. 3
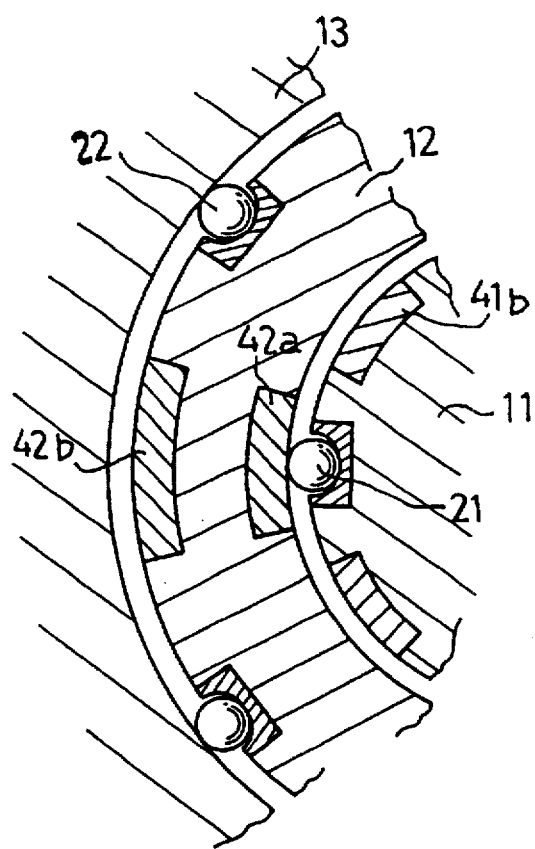

ROTARY APPARATUS

TECHNICAL FIELD

The present invention relates to a rotary apparatus capable of rotating a composite rotor at a high speed with a magnetic force, which is structured by arranging a plurality of ring-shaped rotors concentrically with each other.

BACKGROUND ART

Heretofore, no rotary apparatus is known which can rotate a composite rotor at a high speed, which has a plurality of ring-shaped rotors arranged concentrically with each other.

Therefore, the present invention has the object to provide such a novel rotary apparatus.

DISCLOSURE OF INVENTION

In a first aspect of this invention, a rotary apparatus is provided, which is characterized in that a central rotor is centrally arranged so as to be rotatable; a plurality of ring-shaped rotors are arranged concentrically with said central rotor in a relationship spaced apart from each other so as to be rotatable coaxially with said central rotor about its rotational axis; a group of magnetic poles are disposed on a surface of each rotor on the side facing a surface of the adjacent rotor; a group of the magnetic poles disposed on the surface of each rotor is so arranged as to make each of the magnetic poles equal in polarity to another group of the magnetic poles disposed on the surface of the adjacent rotor; and each magnetic pole of the group of the magnetic poles of each rotor is arranged alternately in the rotational direction with each respective magnetic pole of the another group of the magnetic pole of the adjacent rotor.

For the rotary apparatus in the first aspect of this invention, the driving force for rotation applied to the central rotor is transmitted to the outer adjacent rotor one after another by a magnetic repulsive force which is caused to be produced between the rotor and the adjacent rotor so as to repel against the displacement of the rotor in the circumferential direction of the rotation of the rotor. As a result, all the rotors are caused to rotate integrally with each other.

Once the rotary apparatus starts rotating at a high speed, the speed of the rotor on the outer side becomes unlikely to vary due to the effect of a flywheel, thereby inducing a so-called "return-back" phenomenon, i.e. a phenomenon of causing the force of urging the rotation transmitted from the side of the central rotor to turn at the rotor on the outermost side through the rotors on the inner side and eventually back to the central rotor. This "return-back" phenomenon greatly serves as accelerating the rotational speed of each rotor in an extremely efficient way, thereby achieving an extremely high rotational speed.

Further, the present invention in its second aspect provides a rotary apparatus characterized in that the central rotor is centrally arranged so as to be rotatable; a plurality of ring-shaped rotors are arranged concentrically with the central rotor in a relationship spaced apart from each other so as to be rotatable coaxially with the central rotor about its rotational axis; first and second groups of magnetic poles are disposed on the surface of each rotor on the side facing the surface of the adjacent rotor; the first and second groups of the magnetic poles disposed on the surface of each rotor are so arranged as to make each of the magnetic poles equal in polarity to another first and second groups of the magnetic poles disposed on the surface of the adjacent rotor, respectively; each magnetic pole of the first group of the magnetic poles disposed on the surface of each rotor is arranged alternately in the rotational direction with each respective magnetic pole of the another group of the magnetic poles disposed on the surface of the adjacent rotor; and each magnetic pole of the second group of the magnetic poles disposed on the surface of each rotor is arranged so as to overlap with each magnetic pole of the second group of the magnetic poles disposed on the surface of the adjacent rotor.

This arrangement of the rotary apparatus can rotate each of the rotors smoothly because the magnetic repulsive force acting between the first group of the magnetic poles of the rotor can cancel the influence of the magnetic poles having the opposite polarity appearing between the first group of the magnetic poles of the rotor.

In further aspects of this invention, the rotary apparatus is provided, wherein the group or the first and second groups of the magnetic poles is or are disposed on a side surface of each rotor, extending in a direction perpendicular to the radial direction of the rotor, or wherein each rotor is arranged with the adjacent rotor so as to form an overlapped portion where a portion of the each rotor overlaps with a portion of the adjacent rotor in a vertically spaced relationship from each other and the group or the first and second groups of the magnetic poles is or are disposed on a surface of the overlapped portion of the rotor.

In a still further aspect, the present invention provides a rotary apparatus wherein the group of the magnetic poles is comprised of a plurality of magnetic poles arranged in a relationship apart at a given constant distance from each other in the circumferential direction of the rotor.

In another still aspect, the present invention provides a rotary apparatus wherein the central rotor and/or the outermost rotor is provided with a reverse rotation blocking means for blocking the reverse rotation of the respective rotor.

This arrangement can convert the urging force applied from the outside into the force for urging the rotation of each rotor with high efficiency by the means for blocking the reverse rotation mounted to the central rotor even at the time of the start of the rotation of the rotary apparatus. Further, the same phenomenon as the return-back phenomenon as described hereinabove can be produced by the means for blocking the reverse rotation, mounted to the rotor on the outermost side out of the plural rotors, thereby enabling the rotational speed of each rotor to be increased extremely effectively even at the time of the rise during the start of rotation.

BRIEF DESCRIPTION OF THE DRAWINGS

FIG. 3 is a view in section showing the mounting of bearings and permanent magnets between the ring-shaped rotors for the rotary apparatus according to the embodiment of this invention.

3

Figure 6:
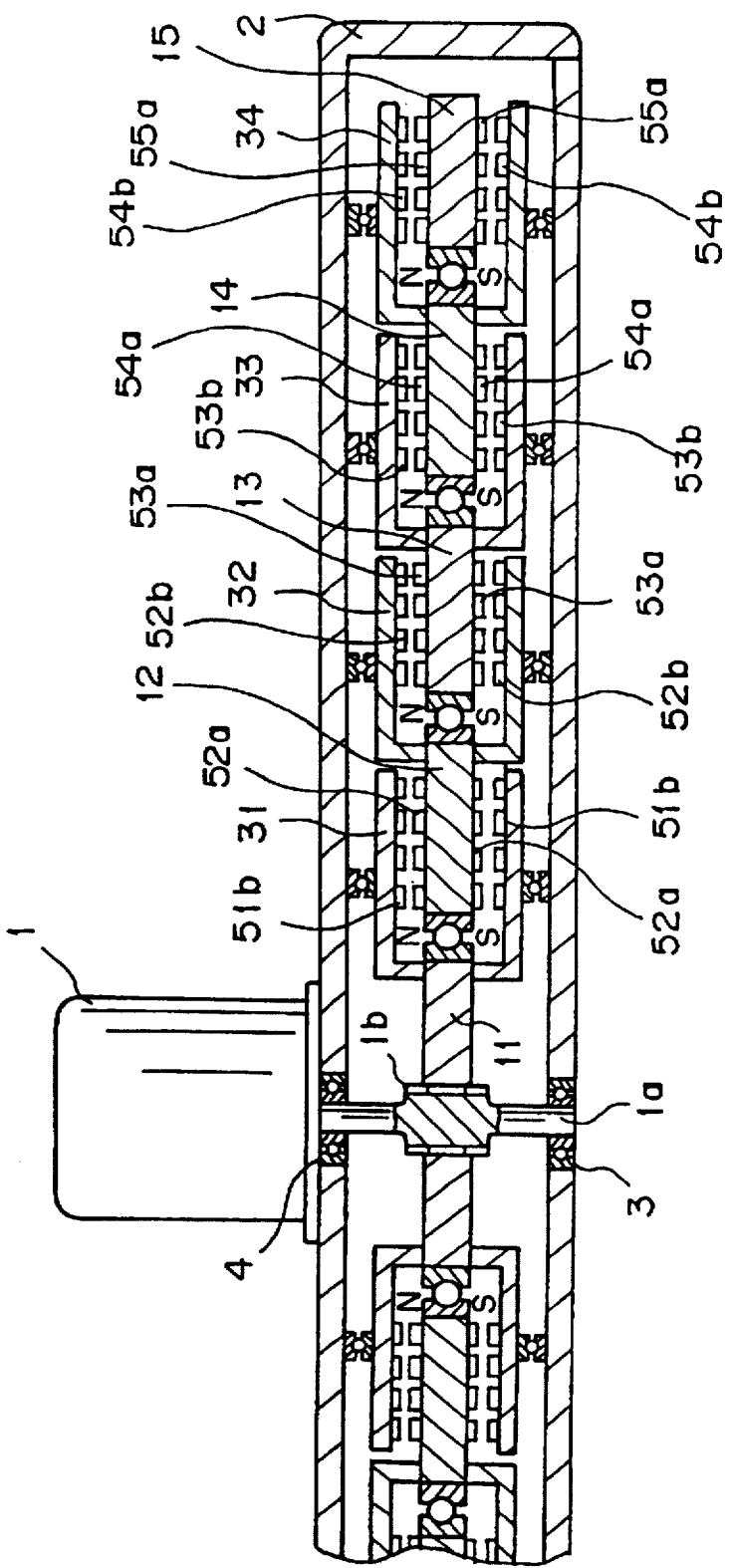

FIG. 6 is a partial side view in section showing the arrangement of permanent magnets in the rotary apparatus according to another embodiment of this invention.

Figure 7:
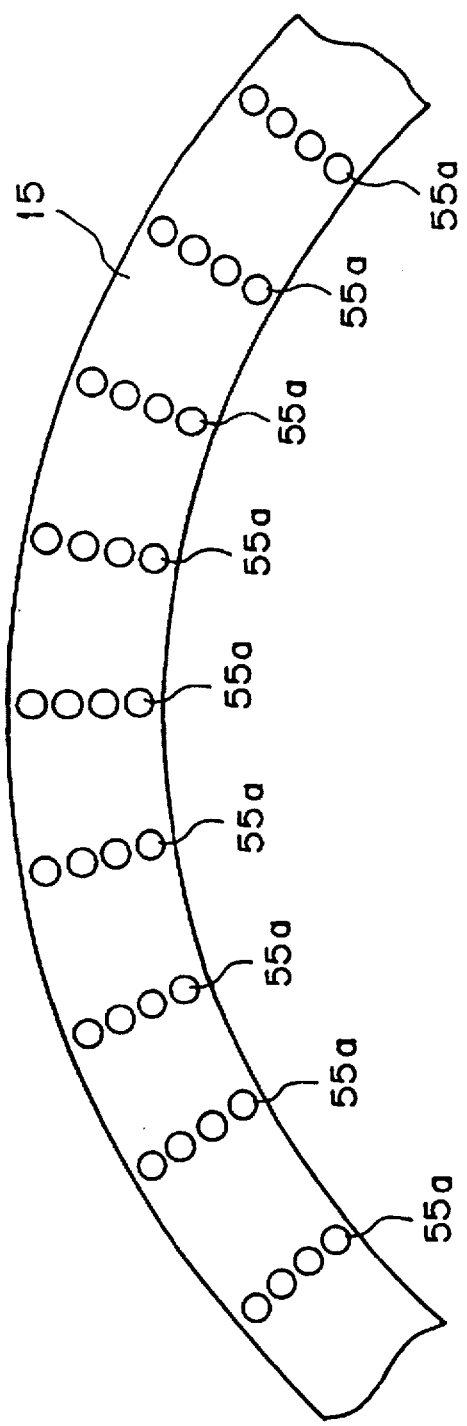

FIG. 7 is a schematic representation showing the arrangement of the permanent magnets according to another embodiment of this invention.

Figure 8:
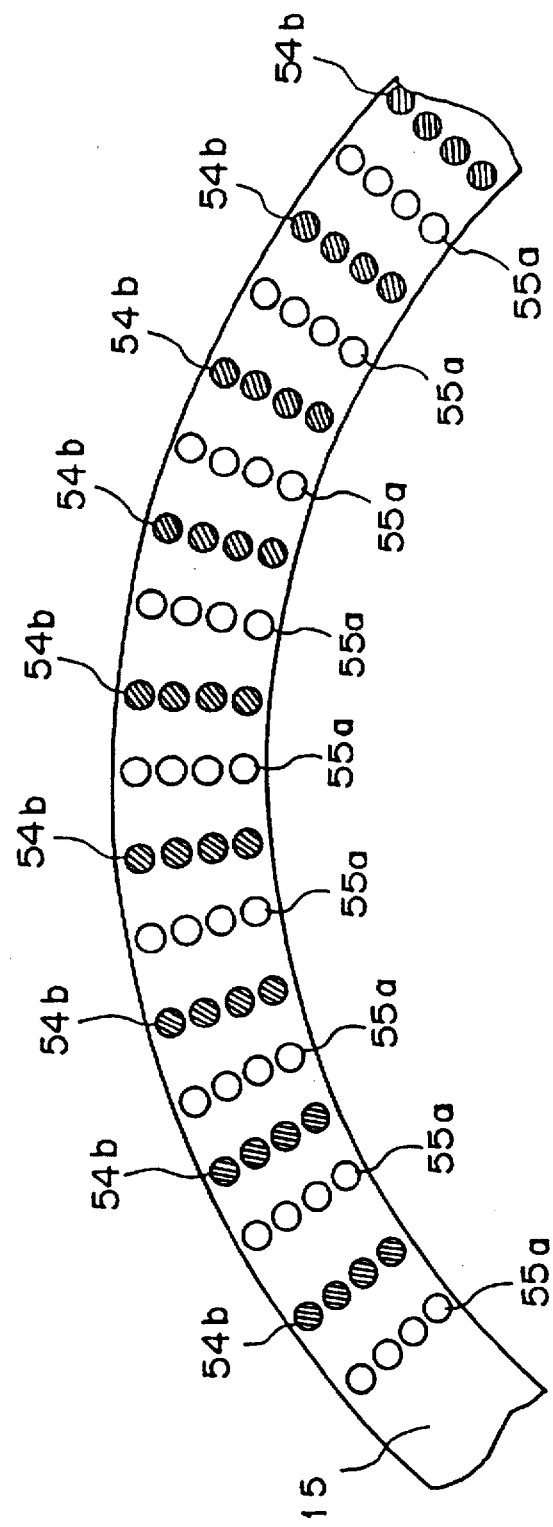

FIG. 8 is a schematic representation showing another example of the arrangement of permanent magnets in the rotary apparatus according to another embodiment of this invention.

Figure 9:
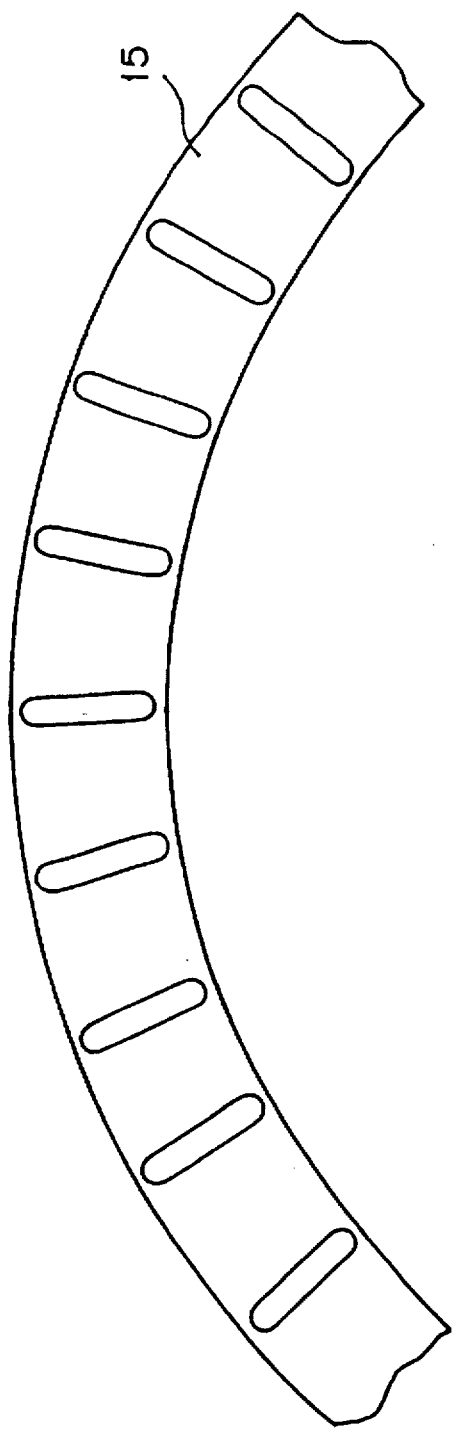

FIG. 9 is a schematic representation showing the arrangement of permanent magnets for the rotary apparatus according to a further embodiment of this invention.

Figure 10:
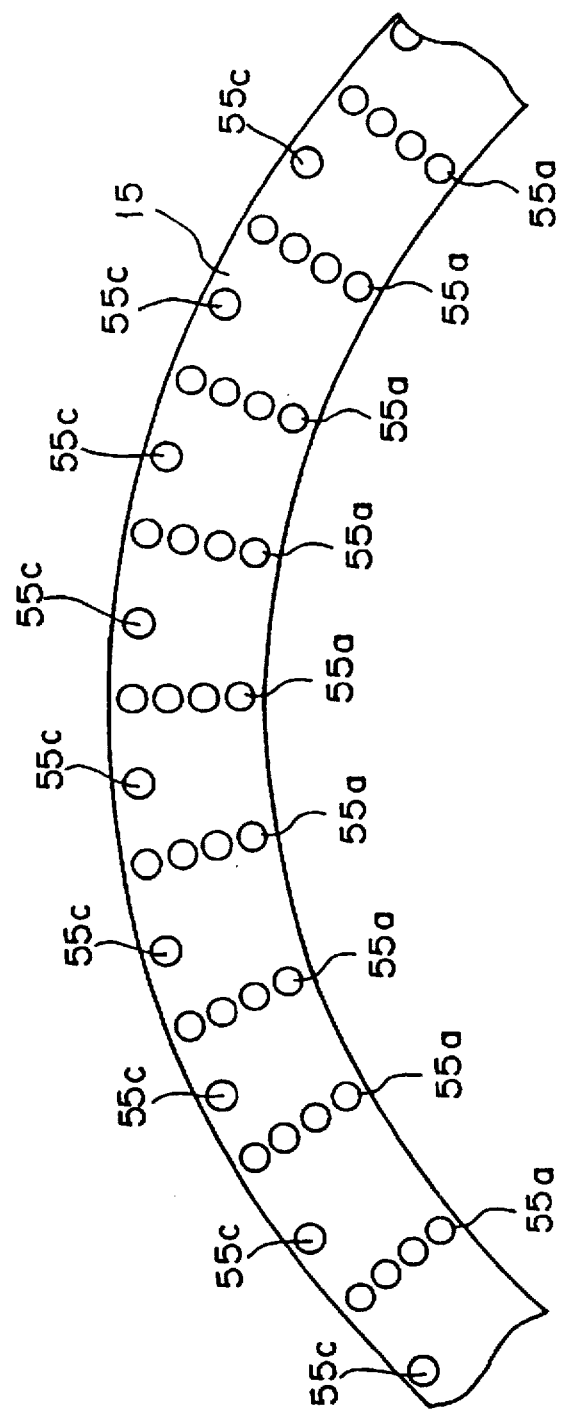

FIG. 10 is a schematic representation showing the arrangement of permanent magnets for the rotary apparatus according to a still further embodiment of this invention.

Figure 11:
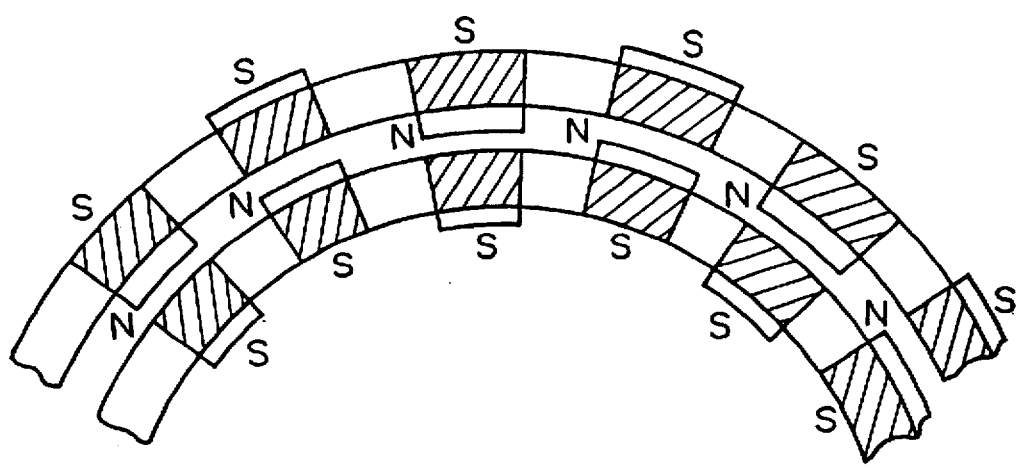

FIG. 11 is a schematic representation showing the arrangement of permanent magnets for the rotary apparatus according to a still further embodiment of this invention.

Figure 12:
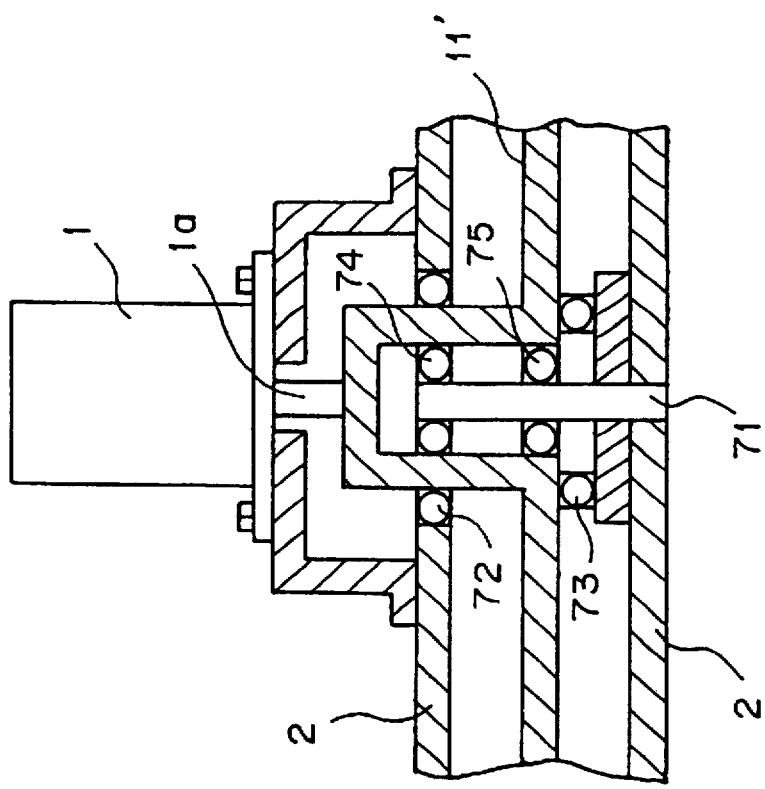

FIG. 12 is a partially cut-away, side view in section showing the structure of a rotary disc section in the rotary apparatus according to a still further embodiment of this invention.

BEST MODES FOR CARRYING OUT THE INVENTION

The present invention will be described in more detail by way of examples with reference to the accompanying drawings.

Figure 1:
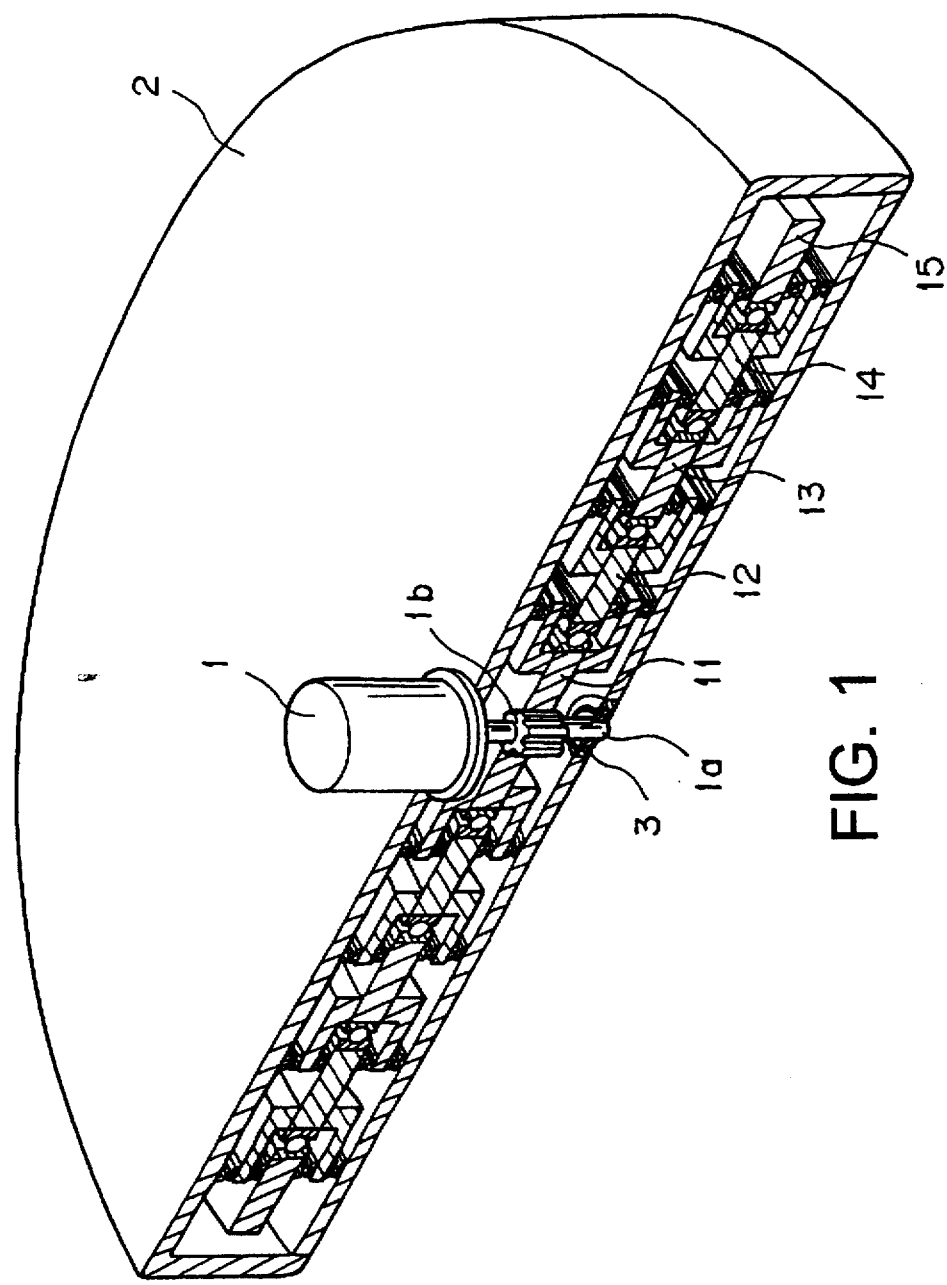
FIG. 1 is a longitudinally cut-away, sectional perspective view showing an outline of the rotary apparatus according to an embodiment of the present invention.
Figure 2:
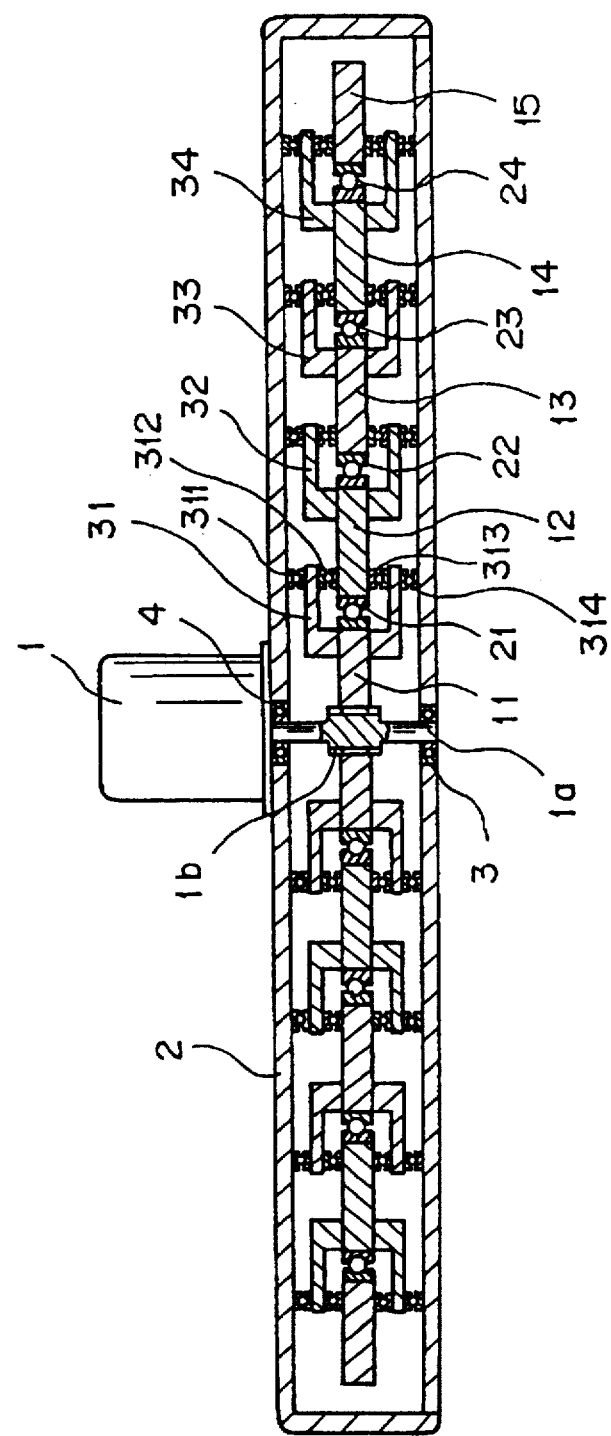
FIG. 2 is a side view in section showing the details of the rotary apparatus according to the embodiment of this invention.

FIG. 1 is the longitudinally cut-away, perspective view in section showing the outline of the rotary apparatus according to the embodiment of the present invention; FIG. 2 shows the details of the rotary apparatus according to the embodiment of this invention; and FIG. 3 shows the arrangement of the mounting of the bearings and the permanent magnets between the ring-shaped rotors for the rotary apparatus according to the embodiment of this invention. As shown in these drawings, a housing 2 of this rotary apparatus is of a hollow disc shape and a motor 1 is mounted to an upper surface of the housing 2 in its central position. The motor 1 is structured in such a manner that its output shaft 1a extends inside in its central position through the housing 2 over the entire vertical length and that bearings 3 and 4 are mounted between the housing 2 and the output shaft 1a so as for the output shaft 1a to be rotatable.

To the output shaft 1a is fixed in its nearly central position a spline gear 1b which, in turn, is engaged with a spline groove disposed in a central position of a disc plate 11 so as to rotate the disc plate 11 integrally with the output shaft 1a when the motor 1 is rotated. For example, four ring-shaped plates 12 to 15, respectively, each having different radius, are arranged concentrically with the disc plate 11 in a radially spaced relationship apart from each other. Each of the ring-shaped plates 12 to 15 is a plate of a ring-shaped form, rectangular in section. Between the disc plate 11 and the ring-shaped plate 12 and between two of the adjacent the ring-shaped plates 12 to 15 are arranged spherical bearings 21 to 24, respectively, thereby allowing each of the disc plate 11 and the ring-shaped plates 12 to 15 to rotate independently and their relative positions to be displaced smoothly.

To an upper surface at its outer circumferential and end portion of each of the disc plate 11 and the ring-shaped plates 12 to 14 is fixed an upper section of each of vertical movement restricting members 31 to 34 in a cross-sectional Γ-shaped ring plate form for restricting the vertical move-

4 ment of the disc plate 11 and the ring-shaped plates 12 to 14, respectively. Likewise, to an under surface of each of the disc plate 11 and the ring-shaped plates 12 to 14 is fixed a lower section of each of vertical movement restricting members 31 to 34 in a cross-sectional L-shaped ring plate form for restricting its vertical movement, respectively, at its outer circumferential end portion. Each of the free end portions of the respectively Γ- and L-shaped upper and lower sections of the vertical movement restricting members 31 to 34 is disposed extending up to the inner circumferential end portions of each of the adjacent ring-shaped plates 12 to 15, respectively. Between the vertical movement restricting members 31 to 34, the ring-shaped plates 12 to 15, and the housing 2 are disposed spherical bearings. For instance, a spherical bearing 311 is mounted between the upper surface of the free end portion of each of the Γ-shaped upper section of the vertical movement restricting members 31 to 34 and the under surface of the housing 2 in the position right above the free end portion thereof; a spherical bearing 312 is mounted between the under surface of the free end portion of each of the Γ-shaped upper section of the vertical movement restricting members 31 to 34 and the upper surface of the ring-shaped plates 12 to 15 in the position right under the free end portion thereof; a spherical bearing 313 is mounted between the under surface of the ring-shaped plates 12 to 15 and the upper surface of the free end portion of each of the L-shaped under section of the vertical movement restricting members 31 to 34; and a spherical bearing 314 is mounted between the under surface of the free end portion of each of the L-shaped under section of the vertical movement restricting members 31 to 34 and the upper surface of the under plate of the housing 2 in the position right under the free end portion of each of the L-shaped under sections of the vertical movement restricting members 31 to 34, respectively. The arrangement of the spherical bearings 311 to 314 for the ring plate members 31 to 34 can prevent the disc plate 11 and the ring-shaped plates 12 to 15 from moving vertically during their rotation.

In the embodiment according to this invention, assemblies of the disc plate 11 and each of the ring-shaped plates 12 to 15 with the ring plate members 31 to 34 are arranged concentrically with the disc plate 11, thereby constituting a composite rotor.

Each of the disc plate 11 and the ring-shaped plates 12 to 15 may be made of a semi-magnetic or non-magnetic material such as copper, aluminium or an alloy such as brass. Each of the ring-shaped plates 12 to 15 is arranged so as to become larger in radius at a constant length than the adjacent ring-shaped plate to be disposed on its inner side and the ring-shaped plates 12 to 15 are disposed concentrically with the disc plate 11 with a gap spaced equally apart from each other in such a manner that the ring-shaped plate having the smallest radius is disposed at the outer circumference of the disc plate 11, the ring-shaped plate having a larger radius is disposed at the outer circumference of the adjacent ring-shaped plate having the smaller radius, and the ring-shaped plate having the largest radius is disposed at the outermost circumference of the composite rotor.

Each of the ring-shaped plates is embedded in cavities formed in its surface facing the adjacent ring-shaped plate with a plurality of permanent magnets so as not to project from the respective flat side surface of the ring-shaped plate embedded in the cavity. More specifically, the disc plate 11 is embedded with a plurality of permanent magnets 41 in cavities formed in its outer circumferential side surface; the ring-shaped plate 12 with a plurality of permanent magnets 42 in cavities formed in its inner and outer circumferential side surface and; the ring-shaped plate 13 with a plurality of permanent magnets 43 in cavities in its inner and outer circumferential side surface; the ring-shaped plate 14 with a plurality of permanent magnets 44 in cavities formed in its inner and outer circumferential side surface; and the ring-shaped plate 15 with a plurality of permanent magnets 45 in cavities in its inner circumferential side surface. Each of the permanent magnets 41 to 45 may be arranged at an equal angle of 60° at a given distance from the center of rotation. In the description that follows, each of the permanent magnets 41 to 45 is provided with reference symbol "a" after the corresponding reference numeral for those which are arranged on the inner circumferential side of the plate and with reference symbol "b" thereafter for those which are arranged on its outer circumferential side, as needed for distinction from each other.

Each of the permanent magnets 41 to 45 is arranged so as for the permanent magnet disposed on a surface of the plate facing a surface of the adjacent plate of the disc plate 11 or facing a surface of each of the ring-shaped plates 12 to 15 to be made equal in polarity to the permanent magnet disposed on the surface of the adjacent plate of the disc plate 11 or the ring-shaped plate 12 to 15. In other words, for instance, the permanent magnets 41b disposed at the outer circumferential surface of the disc plate 11 and the permanent magnets 42a disposed at the inner circumferential surface of the ring-shaped plate 12 are directed all to the North magnetic pole; the permanent magnets 42b disposed at the outer circumferential surface of the ring-shaped plate 12 and the permanent magnets 43a at the inner circumferential surface of the ring-shaped plate 13 are directed all to the South magnetic pole; the permanent magnets 43b disposed at the outer circumferential surface of the ring-shaped plate 13 and the permanent magnets 44a at the inner circumferential surface of the ring-shaped plate 14 are directed all to the North magnetic pole; and the permanent magnets 44b at the outer circumferential surface of the ring-shaped plate 14 and the permanent magnets 45a at the inner circumferential surface of the ring-shaped plate 15 are directed all to the South magnetic pole.

Figure 4:
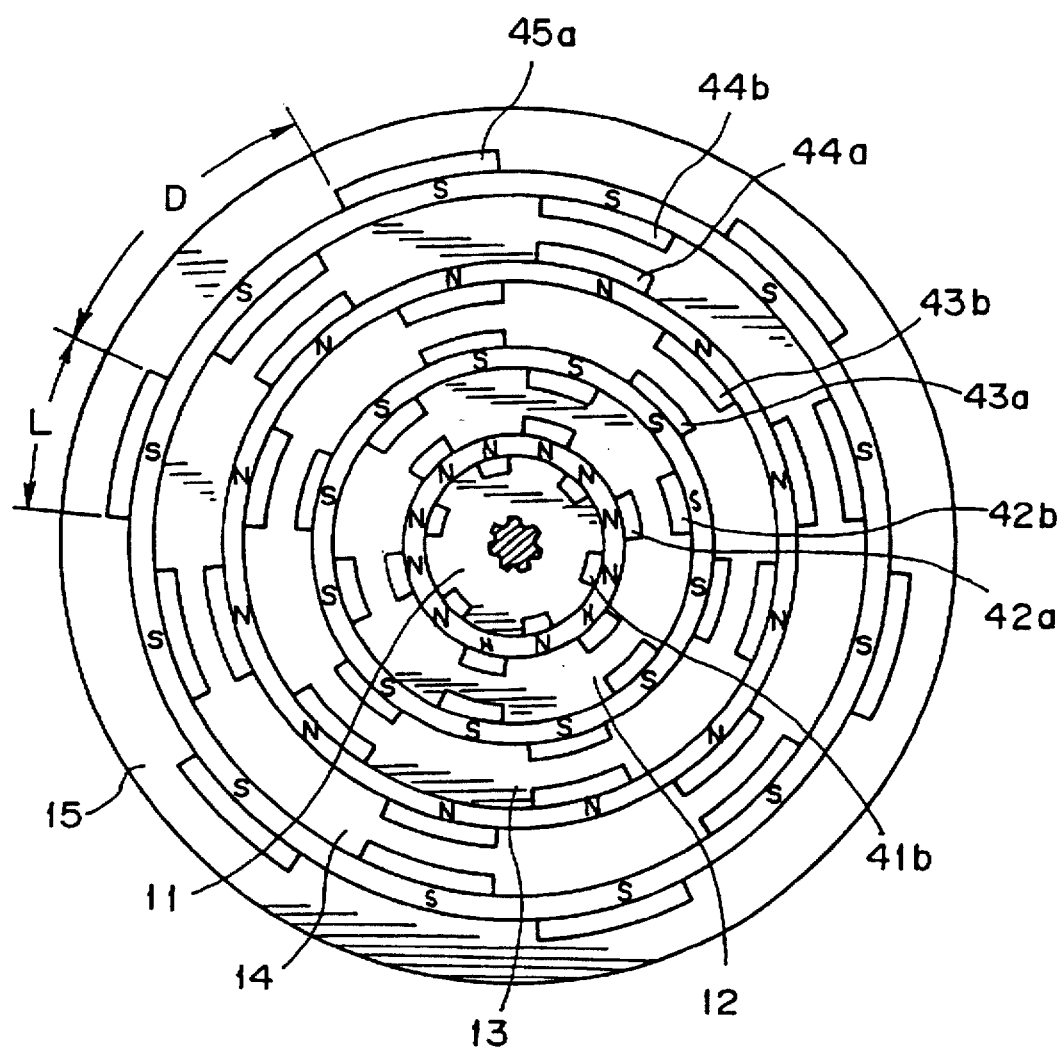
FIG. 4 is a plan view showing an example of the arrangement of permanent magnets for the rotary apparatus according to the embodiment of this invention.

Further, as shown in FIG. 4, the disc plate 11 and the ring-shaped plates 12 to 15 are arranged such that, for example, for the ring-shaped plate 15, the arc distance D interposed between the permanent magnet 45a and the adjacent permanent magnet 45a is set to be longer than the arc length L of each of the permanent magnets 45a.

Now, the actions and operations of the rotary apparatus according to the embodiment of this invention will be described hereinafter.

Figure 5A:
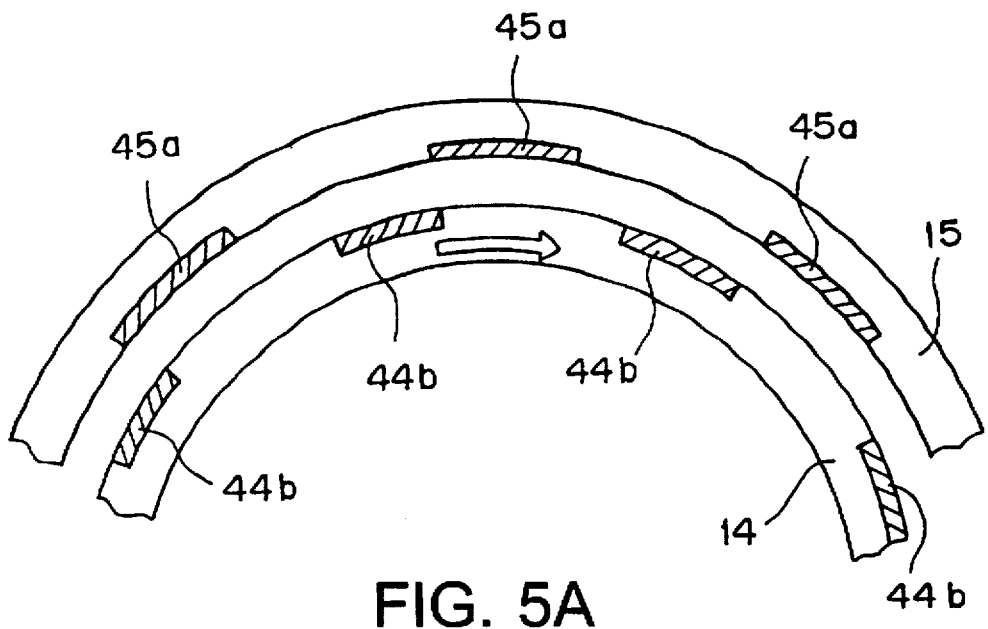
FIGS. 5(a) and (b) are each a schematic representation for describing the operations of the rotary apparatus according to the embodiment of this invention.
Figure 5B:
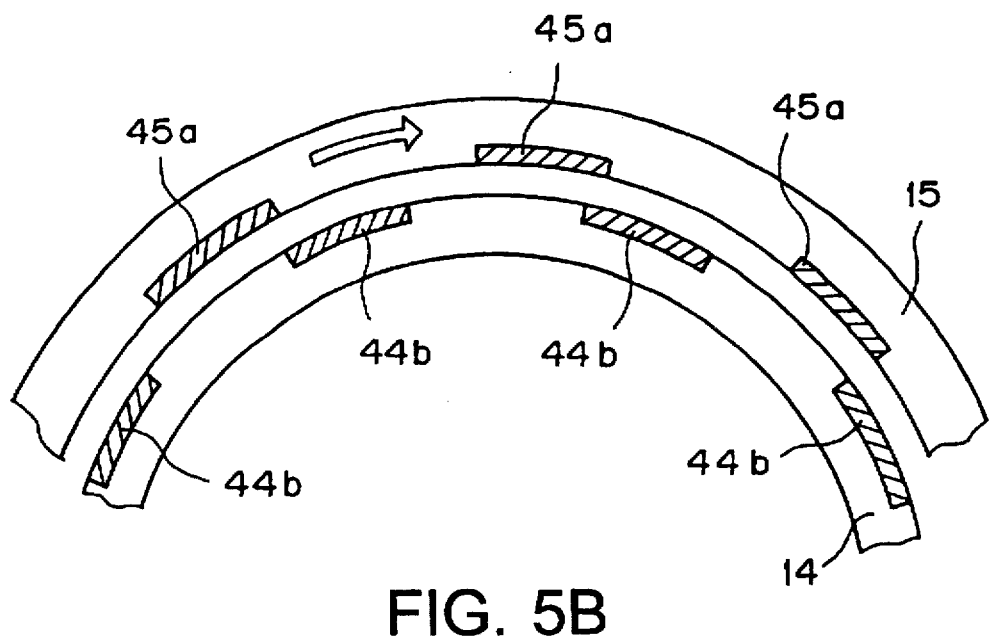

First, a description will be made of the basic actions of the permanent magnets 41 to 45 mounted to the disc plate 11 and the ring-shaped plates 12 to 15, respectively, with reference to FIGS. 5(a) and 5(b) by taking the permanent magnets 44b disposed on the outer circumferential surface of the ring-shaped plate 14 and the permanent magnets 45a disposed on the inner circumferential surface of the ring-shaped plate 15 as an example. FIG. 5(a) shows the instance where the ring-shaped plate 14 is rotated in the normal direction (in the clockwise direction in the drawing). In this case, the permanent magnets 44b of the ring-shaped plate 14 are allowed to come closer to the respective permanent magnets 45a of the ring-shaped plate 15, which are located ahead in the direction in which the ring-shaped plate 14 is being rotated, and the ring-shaped plate 15 is caused to rotate in the normal direction by the repulsive force (repulsion) produced between the permanent magnets 44b of the ring-shaped plate 14 and the permanent magnets 45a of the ring-shaped plate 15 because the permanent magnets 44b of the ring-shaped plate 14 and the permanent magnets 45a of the ring-shaped plate 15 are directed all to the South magnetic pole. On the other hand, FIG. 5(b) shows the instance where the ring-shaped plate 15 is rotated in the normal direction, to the contrary of the instance as shown in FIG. 5(a). In this case, the permanent magnets 45b of the ring-shaped plate 15 are allowed to come closer to the respective permanent magnets 44a of the ring-shaped plate 14, which are located ahead in the direction of the rotation of the ring-shaped plate 15, and the ring-shaped plate 14 is caused to rotate in the normal direction by the repulsive force produced between the permanent magnets 45b of the ring-shaped plate 15 and the permanent magnets 44a of the ring-shaped plate 14.

Then, a description will be made of the operations of starting the rotation of the rotary apparatus. As the motor 1 is rotated in its normal direction, the disc plate 11 is caused to rotate in the normal direction and the rotation of the disc plate 11 induces the rotation of the ring-shaped plate 12 located on the innermost side, followed by rotating the ring-shaped plate 13 located on the adjacent side of the ring-shaped plate 12 in the normal direction and further by rotating the ring-shaped plate 14 and the ring-shaped plate 15 one after another in the normal direction in the likewise manner, on the basis of the principle as described with reference to FIG. 5(a). Hence, once the motor 1 starts up, the disc plate 11 is first allowed to rotate in the normal direction, followed by the normal rotation of all the ring-shaped plates 12 to 15 one after another, which are arranged concentrically with the disc plate 11.

It is to be noted herein that the magnitude of the repulsive force acting between every two plates out of the disc plate 11 and the ring-shaped plates 12 to 15 is set to be the extent of the force to which each of the permanent magnets disposed on the surface of one plate does not cross the position of each of the respective permanent magnets disposed on the facing surface of the adjacent plate. In other words, although there is a so-called "magnetic mountain" caused by the repulsive force in the position of each permanent magnet, each of the permanent magnets disposed on the surface of the one plate does not cross the so-called magnetic mountain ahead or behind of the position of each respective permanent magnet disposed on the facing surface of the adjacent plate. Therefore, the disc plate 11 and the ring-shaped plates 12 to 15 are allowed to rotate in synchronization with each other and integrally at substantially the same speeds, as a whole, although there is to some extent a relative variation in position within the range of the distance at which each of the adjacent permanent magnets is disposed in the circumferential direction.

The rotation of the disc plate 11 is urged by the motor 1 in the manner as described hereinabove, followed by transmitting the force for urging the rotation in the outward direction to the ring-shaped plates 12 to 15 one after another and by increasing the rotational speed gradually after the start of rotation of the disc plate 11 and the ring-shaped plates 12 to 15. As the rotational speed increases, a phenomenon of the return of the force of urging the rotation, as will be described hereinafter, is caused to occur to a remarkable extent, thereby further increasing the speed of the rotation of the disc plate 11 and the ring-shaped plates 12 to 15.

In other words, when account is taken of the relationship between the position of the disc plate 11 and the position of each of the ring-shaped plates 12 to 15 in the initial stage of rotation, the ring-shaped plate 12 is followed and dragged by the ring-shaped plate 13 located on its outer side as a load and the ring-shaped plate 13 in turn is followed and dragged by the ring-shaped plate 14 located on its outer side as a load, followed by causing the ring-shaped plate 14 to be followed and dragged by the ring-shaped plate 15 located on the outermost side as a load. Hence, in the initial stage of rotation, each of the ring-shaped plates 12 to 14 located in the intermediate positions cannot move in such a manner that the ring-shaped plate located on its outer side advances ahead of the position (ahead in the rotational direction) of the ring-shaped plate located on its inner side. On the other hand, as the ring-shaped plate 15 is not followed and dragged as a load by any ring-shaped plate disposed on its outer side, the ring-shaped plate 15 can be rotated further ahead of the ring-shaped plate 14 by the rotational energy transmitted from the ring-shaped plate 14 when the rotation of the ring-shaped plate 14 is urged. The status of the ring-shaped plate 15 relative to the ring-shaped plate 14 is shown in FIG. 5(b).

In the state as shown in FIG. 5(b), as the ring-shaped plate 14 receives the force for urging the rotation in the normal direction from both of the ring-shaped plate 15 located on its outer side and the ring-shaped plate 13 located on its inner side, the rotational speed of the ring-shaped plate 14 is increased. However, since the ring-shaped plate 15 should receive the force having the same magnitude of the repulsive force in the reverse direction, as a reaction, when the ring-shaped plate 14 is supplied with the force for urging the rotation in the normal direction by the repulsive magnetic field, the rotational speed should be decreased to some extent by the reaction having the same magnitude of the repulsive force. Accordingly, the effect of increasing the rotational speed of the ring-shaped plate 15 may be said to be not great.

On the other hand, once the rotational speed of the disc plate 11 and the ring-shaped plates 12 to 15 becomes high, each of the disc plate 11 and the ring-shaped plates 12 to 15 acquires a large amount of the rotational energy and eventually the rotational speed of the plate disposed on its outer side comes to the state in which it does not vary at a high speed due to the flywheel effect because a larger amount of the inertia moment works upon the ring-shaped plate on the outer side due to the fact that the ring-shaped plate on the outer side is larger in diameter and as a result heavier in weight. Consequently, when the force of urging the rotation has reached from the ring-shaped plate disposed on the inner side to the ring-shaped plate 15 disposed on the outermost side and the ring-shaped plate 15 is caused to advance ahead of the ring-shaped plate 14, that is, when the status as shown in FIG. 5(b) has been realized, the ring-shaped plate 15 is pulled back or returned in its reverse direction due to a reaction to the force that has pulled the ring-shaped plate 14 ahead in the normal direction. However, as a matter of fact, the flywheel effect upon the ring-shaped plate 15 is greater than that upon the ring-shaped plate 14, so that the rotational speed of the ring-shaped plate 15 is not substantially decreased. Therefore, the ring-shaped plate 15 serves as the point on which the repulsive force and the reaction to the repulsive force act and the ring-shaped plate 14 can receive the force acted in the reverse direction as the reaction applied to the ring-shaped plate 15, too, as the force for urging the rotation in the normal direction. In other words, the ring-shaped plate 14 can receive the two-fold magnitude of the force for urging the rotation, thereby increasing its rotational speed in the normal direction.

Such a phenomenon also appears in each case between the ring-shaped plates 14 and 13, the ring-shaped plates 13 and 12, and the ring-shaped plate 12 and the disc plate 11. Hence, the force for urging the rotation is transmitted from the disc plate 11 to the ring-shaped plates located on its outer side one after another while increasing the rotational speed of each plate, and as the force for urging the rotation has reached the ring-shaped plate 15, it is returned at the ring-shaped plate 15, followed by transmitting the force for urging the rotation from the ring-shaped plate located on the outer side to each of the ring-shaped plates located on the inner side while increasing the rotational speed of each of the ring-shaped plates. Further, as the rotational speed has reached the disc plate 11, it is returned again at the disc plate 11, followed by transmitting the force for urging the rotation from each of the ring-shaped plates on the inner side to each of the ring-shaped plates on the outer side. Therefore, the disc plate 11 and the ring-shaped plates 12 to 15 can be rotated extremely effectively, thereby providing a high rotational speed.

It can be noted herein that, when the plates are being rotated at a high speed, the phenomenon of returning the force for urging the rotation is observed as if one wave is being propagated or is running from inward to outward and then from outward to inward among the disc plate 11 and the ring-shaped plates 12 to 15. It is assumed that such a phenomenon appears in such a fashion that, as the magnetic repulsive force between each adjacent layers of the disc plate 11 and the ring-shaped plates 12 to 15 becomes bigger and bigger from the inner adjacent layers thereof toward the outer adjacent layers thereof once the driving force is applied from the motor 1, if the magnetic repulsive force between each of the adjacent plates becomes so big that it exceeds a certain critical point, it turns into the force for rapidly pushing the ring-shaped plate 15 forwards and the force is transmitted in such a wavy form.

In practicing this invention, various modifications and variations are possible. The arrangement of the permanent magnets to be mounted to each plate is not restricted to the embodiment as described hereinabove. For example, various modes of the arrangements of the number of permanent magnets to be mounted to the inner circumferential surface and/or the outer circumferential surface of the disc plate and each of the ring-shaped plates, the size of each permanent magnet, the angle at which the permanent magnets are disposed, the distance between the adjacent permanent magnets, the diameter of the disc plate or each of the ring-shaped plates, the distance between each of the adjacent plates, and the like can be appropriately selected by taking account of the relationship between each of the elements as described hereinabove. Further, the positions in which the permanent magnets are arranged are not restricted to the outer and/or inner circumferential surface or surfaces of the plate and the permanent magnets may be mounted to the vertically facing surface of each of the disc plate and the ring-shaped plates.

FIG. 6 shows another embodiment of this invention, where the arrangement of the permanent magnets is modified. As shown in FIG. 6, the arrangements of the motor 1, the disc plate 11 and the ring-shaped plates 12 to 15 are substantially the same as that in the embodiment as described hereinabove, with the exception that the permanent magnets are mounted to the vertically facing surfaces of each of the disc plate 11 and the ring-shaped plates 12 to 15, not to the side surface thereof.

In other words, in this case, a flange portion of each of the upper and lower free-end sections of the vertical movement restricting members 31 to 34 in the embodiment as described hereinabove is extended outwardly in the radial direction so as to substantially cover the entire length of the respective ring-shaped plates 12 to 15 from upward and downward, respectively. Further, the inside surface of each of the upper and lower free-end sections of the vertical movement restricting members 31 to 34 facing the corresponding surface of the ring-shaped plates 12 to 15 is arranged with permanent magnets 51 to 54 and likewise each of the upper and under surfaces of the ring-shaped plates 12 to 15 is arranged with permanent magnets 51 to 54 so as to face the permanent magnets 51 to 54, respectively, disposed on the ring-shaped plates 12 to 15. The reference numerals 51 to 54 are provided with reference symbol "a" after the reference numeral for the corresponding permanent magnets disposed on the side of the ring-shaped plates 12 to 15 and with reference symbol "b" thereafter for those disposed on the side of the vertical movement restricting members 31 to 34, respectively, as needed for distinction from each other.

FIG. 7 shows the instance of the arrangement of the permanent magnets 51 to 55 by taking the permanent magnets 55a mounted to the ring-shaped plate 15 as an example. As shown in FIG. 7, each of the upper and under surfaces of the ring-shaped plate 15 is arranged radially with four permanent magnets, each in a small disc shape (as indicated by circle marks in the drawing) and they are disposed at equal angles from the center of rotation and in a spaced relationship equally apart from each other along and in the circumferential direction. Likewise, the inner surface of the flange portion of the upper and under surfaces of the vertical movement restricting member 34 facing the respectively upper and under surfaces of the ring-shaped plate 15 is arranged with the permanent magnets 54b in substantially the same manner.

The permanent magnets 55a and 54b are arranged such that the permanent magnets 54b of the vertical movement restricting member 34 facing the upper surface of the ring-shaped plate 15 are made equal in polarity to the permanent magnets 55a of the ring-shaped plate 15. In other words, in this embodiment, the permanent magnets 54b disposed on the inner and upper surface of the vertical movement restricting member 34 and the permanent magnets 55a disposed on the upper surface of the ring-shaped plate 15 are directed all to the North magnetic pole, while the permanent magnets 54b disposed on the inner and under surface of the vertical movement restricting member 34 and the permanent magnets 55a disposed on the under surface of the ring-shaped plate 15 are directed all to the South magnetic pole.

It is to be noted herein that in the state in which the ring-shaped plate 15 is resting and the magnetic repulsive force acting between the permanent magnets 55a disposed on the ring-shaped plate 15 and the permanent magnets 54b disposed of the vertical movement restricting member 34 is balanced, the permanent magnets 55a of the ring-shaped plate 15 (as indicated by white circle marks) are arranged alternately in the circumferential direction with the permanent magnets 54b of the vertical movement restricting member 34 (as indicated by hatched circle marks), as shown in FIG. 8.

Further, although the number of the permanent magnets arranged radially on each of the ring-shaped plates in the embodiment as described hereinabove, the angle at which the permanent magnets are arranged radially is made larger as the diameter of the ring-shaped plate becomes smaller, thereby making the distance between the adjacent groups of the four permanent magnets substantially equal to each other. Hence, in this case, the number of the permanent magnets is increased for the ring-shaped plates to be disposed on the outer side.

The basic operations of the rotary apparatus according to the embodiment of this invention, as shown in FIG. 6, are substantially the same as those of the rotary apparatuses according to the embodiments of this invention as described hereinabove wherein the arc-shaped permanent magnets in a plate form are employed, with the exception that a number of permanent magnets, each in a small disc shape, are combined. In this respect, a duplicate description of the details will be omitted from the following description.

Although there are employed permanent magnets each in a small disc shape for the rotary apparatus as shown in FIG. 6, as described hereinabove, the reason for the use of such permanent magnets is merely because they are easy for production. Hence, this invention is not restricted to the permanent magnets of such small disc shapes and it can include, for example, permanent magnets of a generally rectangular shape with longer sides of each permanent magnet arranged radially, for example, as shown in FIG. 9. It is further possible to use only one disc-shaped permanent magnet having a longer diameter, instead of the four small disc-shaped permanent magnets employed for the previous embodiments of this invention. In this case, too, the large disc-shaped permanent magnets may be arranged radially at equal angles from each other in the circumferential direction.

It should be noted herein, however, that the rotary apparatuses according to the embodiments of this invention as described hereinabove present problems as will be described hereinafter. A description will be made of such problems, for example, by taking the rotary apparatus according to the first embodiment of this invention as an example. For example, in the instance as shown in FIG. 4, as a loop of the magnetic flux goes out from the permanent magnets 44a on the inner side and returns to the permanent magnets 44b on the outer side, the South magnetic poles of the permanent magnets 44b opposite to the polarities of the permanent magnets 44a can be said to be seen in the position between the adjacent permanent magnets of the ring-shaped plate, for example, between the mutually adjacent permanent magnets 44a directed to the North magnetic pole. In this case, the permanent magnets directed to the South magnetic pole have the action to attract the North magnetic pole of the adjacent ring-shaped plate 13. As a result, the South magnetic pole of the ring-shaped plate 14 exerts the influence upon the North magnetic pole of the facing ring-shaped plate 13, thereby decreasing the circumferential movement of the ring-shaped plate 13 in the normal direction to some extent. This phenomenon can be described by taking "magnetic mountain" of the magnetic repulsive force and "magnetic valley" thereof as an example. This status can be said to be the state in which the facing ring-shaped plate is unlikely to cross the magnetic valley and move further on, because the magnetic valley is too deep. In such a state, the force for urging the rotation cannot be transmitted efficiently between the ring-shaped plates.

FIG. 10 shows an example of the rotary apparatus according to the further embodiment of this invention, which can solve the problems as described immediately hereinabove. This example is a variation of the second embodiment (the example as shown in FIG. 6) of the rotary apparatus according to this invention, in which the arrangement of the permanent magnets is modified and the permanent magnets 55a of the ring-shaped plate 15 is taken as an example. In other words, another group of permanent magnets 55c having the same polarities as the other group of the permanent magnets 55a is further disposed in the intermediate positions between the adjacent permanent magnets 55a.

Likewise, permanent magnets having the same polarities are disposed in the intermediate position between the adjacent permanent magnets 54b of the ring-shaped plate 14 facing the ring-shaped plate 15. This allows the permanent magnets disposed on the circumferentially outermost side at the facing surfaces of the adjacent ring-shaped plates 14 and 15 to overlap with each other, when the ring-shaped plates 14 and 15 are resting.

This arrangement allows the magnetic attractive force of the magnetic poles having the opposite polarity seen between the adjacent permanent magnets 55b to be cancelled by the magnetic repulsive force of the newly added permanent magnets 55c, which acts between the overlapped permanent magnets of the adjacent ring-shaped plates, thereby enabling a smooth displacement between the ring-shaped plates.

It can be noted herein that the arrangement as shown in FIG. 11 can reduce the influence of the magnetic poles having the opposite polarity appearing between the adjacent permanent magnets. This embodiment is arranged in such a manner that the radially extending width of each of the ring-shaped plates is narrowed, as compared with the previous embodiment of the rotary apparatus according to this invention (the drawing as shown in FIGS. 1 and 2) and a through hole is provided for each ring-shaped plate so as to pass radially over the entire length, through and into which the permanent magnet is embedded over its entire depth. FIG. 11 shows two out of the ring-shaped plates from top. The hatched portions in the drawing are the portions at which the permanent magnets are embedded into the corresponding ring-shaped plates. It can be noted herein that the permanent magnets are structured in such a manner that the permanent magnets with their end portions projecting from the side surface of the ring-shaped plate are arranged alternately with the permanent magnets with their end made as flat as the surface of the ring-shaped plate into which the permanent magnets are embedded.

FIG. 12 indicates an example of the rotary apparatus according to the further embodiment of this invention and is a longitudinally cross-sectional side view showing the portion of a disc 11' rotating in the center of the rotary apparatus. As shown in the drawing, a core shaft 71 is fixed to a housing 2. A hollow convex portion is formed at a central portion of the disc 11'0 and bearing systems 74 and 75 are disposed between the core shaft 71 and the inner surface of the convex portion of the disc 11' so as to allow the disc 11' to rotate about the core shaft 71. Further, another groups of bearing systems 72 and 73 are disposed between the disc 11' and the housing 2. To the convex portion of the disc 11' is fixed an output shaft 1a of the motor 1 to thereby allow the disc 11' to be rotated directly by the motor 1. It should be noted herein that at least one of the bearing systems 72 to 75 be structured as a rachet bearing system, thereby causing the disc 11' to be rotated only in the normal direction while inhibiting the rotation in the reverse direction.

The mounting of the rachet bearing system to the central disc 11' can provide the merits as will be described hereinafter. In other words, when the disc plate 11' is rotated by the motor 1 at the time of its start-up, thereby urging the rotation of the adjacent ring-shaped plate 12 in the normal direction, the disc plate 11' receives the magnetic repulsive force in the reverse direction from the ring-shaped plate 12 as a reaction thereto. However, the rachet bearing system blocks the reverse rotation of the disc plate 11' and the magnetic repulsive force from the ring-shaped plate 12 acted as the reaction is turned into the force for urging the rotation of the ring-shaped plate 12 in the normal direction in the position in which the rachet bearing system has acted (the rachet bearing system has blocked the reverse rotation). Therefore, the ring-shaped plate 12 can receive a two-fold magnitude of the magnetic repulsive force in the normal direction, compared with the instance where no rachet bearing system is disposed on the ring-shaped plate 12, thereby increasing the rotational speed of the ring-shaped plate 12. Further, this arrangement can allow even a small-size motor to convert its rotational output into a large magnitude of the rotational force for rotating the ring-shaped plates 12 to 15 efficiently.

The location at which the rachet bearing system is to be mounted is not restricted to the central disc 11' and the rachet bearing system may be incorporated into the ring-shaped plate 15 disposed on the outermost side in an attempt to block the rotation of the ring-shaped plate 15. This arrangement can convert the output of the motor into the rotational force for rotating the ring-shaped plates 12 to 15 with high efficiency even at the time of the start-up of the rotary apparatus, because substantially the same phenomenon may appear as the return phenomenon of returning the force for urging the rotation, which occurs at the time of a high speed, as described hereinabove. Therefore, this arrangement can bring the ring-shaped plates 12 to 15 into a high speed state rapidly after the start of the rotary apparatus.

Further, when the rachet bearing systems may be mounted to all the disc plate 11' and the ring-shaped plates 12 to 15, this arrangement enables the force for urging the rotation to be transmitted with extremely high efficiency at the time of the start of the rotary apparatus. With this arrangement, however, as it can be anticipated that the rachet bearing system may reduce the rotational speed of the rotary apparatus to some extent at the time of rotation at a high speed, the location at which the rachet bearing system is to be mounted should be determined with such possibility taken into account.

Furthermore, when the rachet bearing system is incorporated, it is preferred to use a motor of a type capable of driving the motor intermittently, such as a stepping motor or a servo motor. The motor of this type can convert its rotational output into the rotational energy for rotating the ring-shaped plates 12 to 15 more efficiently. It is further possible to use a system capable of intermittently transmitting the rotational output of a motor of a usual type to a rotary plate, such as an electromagnetic clutch or any other mechanical mechanism, in place of the motors of the intermittently driving type.

In addition, the means for blocking the reverse rotation to be employed for this invention is not restricted to the rachet bearing system and it may include any other system capable of blocking the reverse rotation of the disc plate and each of the ring-shaped plates, such as any mechanism demonstrating the function as a one-way clutch.

The mode of mounting of the permanent magnets to the disc plate and each of the ring-shaped plates is not restricted to the mode in each of the embodiments according to this invention as have been described hereinabove. In summary, the permanent magnets may be mounted to the disc plate and each the ring-shaped plate in such a manner that the magnetic mountain of the magnetic repulsive force appearing between the disc plate and each of the ring-shaped plates is arranged so as to be engaged with the magnetic valley of the magnetic repulsive force at either location between the adjacent layers.

It can further be noted that, although the permanent magnets are employed for the means for generating the magnetic repulsive force between the disc plate and each of the ring-shaped plates, this invention is not restricted to the permanent magnets. In other words, an electromagnet may be employed. Particularly, a superconductive electromagnet can produce an extremely large magnitude of repulsion. A combination of the permanent magnets with the electromagnet may be employed. When the rotary apparatus is sought to be made compact in size, the use of permanent magnets is effective.

The material of the disc plate and each of the ring-shaped plates is not restricted to the material used for them in the previous embodiments of this invention. The material may be a non-magnetic material such as, for example, a synthetic resin or wooden material. The shape of each ring-shaped plate is not restricted to such a shape as employed in the previous embodiments according to this invention and any shape can be applicable as long as each plate can be rotated concentrically.

For the rotary apparatuses according to the above embodiments of this invention, the vertical movement restricting members are disposed in order to prevent the vertical vibration of the disc plate and each of the ring-shaped plates. It can be noted, however, that the arrangement of the vertical movement restricting members is mainly for preparation at the time of the start of the rotary apparatus and, in this sense, the vertical movement restricting member is not essential for this invention. Therefore, the actions of the vertical movement restricting member are not required, particularly when the rotary apparatus has reached its high speed state because each of the ring-shaped plates become into a horizontal arrangement during the time of rotation at a high speed.

Further, for the rotary apparatus in the first embodiment according to this invention, the same polarities of the permanent magnets appearing between the disc plate and each ring-shaped plate are arranged so as for South magnetic poles and North magnetic poles to appear alternately. This invention is not restricted to this arrangement of the same polarities of the permanent magnets and the permanent magnets may be arranged for all their same polarities so as to direct to the South magnetic pole or North magnetic pole.

INDUSTRIAL APPLICABILITY

The present invention can provide a completely novel rotary apparatus so adapted as to rotate a composite rotor at a high speed by utilizing the magnetic force, the composite rotor being comprised of a plurality of ring-shaped rotors arranged concentrically with each other.

It can be noted herein that, although the total weight of the rotary apparatus prepared for trial experiments is so considerably heavy that it cannot be moved manually by an operator at the time when it is not in operation, it surprisingly can be readily moved slidably on a floor by hands of the operator during it is rotated at a high speed.

I claim:

1. A rotary apparatus comprising:
    a central rotor centrally arranged so as to be rotatable;
    a plurality of ring-shaped rotors arranged concentrically with said central rotor in a relationship spaced apart from each other so as to be rotatable coaxially with said central rotor about its rotational axis; and
    magnetic coupling means disposed between adjacent rotors of the plurality of ring-shaped rotors for magnetically coupling the adjacent rotors to each other with a repelling magnetic force,
    wherein the magnetic coupling means includes a group of magnetic poles disposed on each facing surfaces of the adjacent rotors,
    wherein the group of magnetic poles includes a plurality of magnetic poles disposed on the surface of each of the adjacent rotors spaced circumferentially from each other, each magnetic pole having the same polarity as that of the adjacent magnetic pole,
    wherein the group of the magnetic poles disposed on the facing surface of one of the adjacent rotors has the same polarity as the group of magnetic poles disposed on the opposite surface of the other adjacent rotor so as to create repelling magnetic forces between the adjacent groups of magnetic poles, and
    wherein the groups of magnetic poles disposed on the facing surfaces of the adjacent rotors are opposite in polarity to a subsequent group of magnetic poles disposed on the facing surfaces of one of the adjacent rotors.

2. The rotary apparatus of claim 1 further comprising another group of magnetic poles disposed on each of the facing surfaces of the adjacent rotors, wherein said another group of magnetic poles disposed on the facing surface of one of the adjacent rotors has a same polarity as said another group of magnetic poles disposed on the facing surface of the other of the adjacent rotors, and wherein a repelling magnetic force is created between said another group of magnetic poles of the adjacent rotors and when the adjacent rotors are in magnetic equilibrium with each other by means of said magnetic coupling means, said another group of magnetic poles of the adjacent rotors are arranged such that each magnetic pole of said another group of magnetic poles is disposed on one of the adjacent rotor's faces and is juxtaposed with each magnetic pole of said another group of magnetic poles disposed on the other of the adjacent rotors.

3. The rotary apparatus of claim 1, wherein said group of magnetic poles is disposed on a side surface of each rotor, extending in a direction perpendicular to the radial direction of the rotor.

4. The rotary apparatus of claim 2, wherein said another group of magnetic poles is disposed on a side surface of each rotor, extending in a direction perpendicular to the radial direction of the rotor.

5. The rotary apparatus of claim 1, wherein each rotor is arranged with the adjacent rotor so as to form an overlapped portion where a portion of said each rotor overlaps with a portion of said adjacent rotor in a vertically spaced relationship from each other and wherein said group of magnetic poles is disposed on a surface of said overlapped portion of the rotor.

6. The rotary apparatus of claim 2, wherein each rotor is arranged with the adjacent rotor so as to form an overlapped portion where a portion of said each rotor overlaps with a portion of said adjacent rotor in a vertically spaced relationship from each other and wherein said another group of magnetic poles is disposed on a surface of said overlapped portion of the rotor.

7. The rotary apparatus as claimed in any one of claims 1, 3–6, 2, wherein said group of magnetic poles is comprised of a plurality of magnetic poles arranged in a relationship apart at a given constant distance from each other in the circumferential direction of the rotor.

8. The rotary apparatus as claimed in any one of claims 1, 3–6, 2, wherein said central rotor is provided with a reverse rotation blocking means for blocking the reverse rotation of the respective rotor.

* * * * *